(12) United States Patent
Khimich et al.

(10) Patent No.: US 9,378,263 B2
(45) Date of Patent: Jun. 28, 2016

(54) METHOD AND SYSTEM FOR CREATING INDICES AND LOADING KEY-VALUE PAIRS FOR NOSQL DATABASES

(71) Applicant: salesforce.com, inc., San Francisco, CA (US)

(72) Inventors: Oleksandr Khimich, Foster City, CA (US); Dmytro Kudriavtsev, Foster City, CA (US); Pawan Nachnani, Newark, CA (US)

(73) Assignee: salesforce.com, inc., San Francisco, CA (US)

( * ) Notice: Subject to any disclaimer, the term of this patent is extended or adjusted under 35 U.S.C. 154(b) by 332 days.

(21) Appl. No.: 13/860,220

(22) Filed: Apr. 10, 2013

(65) Prior Publication Data
US 2013/0339366 A1    Dec. 19, 2013

Related U.S. Application Data

(60) Provisional application No. 61/661,411, filed on Jun. 19, 2012.

(51) Int. Cl.
G06F 17/30 (2006.01)

(52) U.S. Cl.
CPC .... *G06F 17/30587* (2013.01); *G06F 17/30303* (2013.01); *G06F 17/30321* (2013.01)

(58) Field of Classification Search
CPC ............ G06F 17/30371; G06F 17/587; G06F 17/30321
USPC .......................................................... 707/741
See application file for complete search history.

(56) References Cited

U.S. PATENT DOCUMENTS

| 5,577,188 | A | 11/1996 | Zhu |
| 5,608,872 | A | 3/1997 | Schwartz |
| 5,649,104 | A | 7/1997 | Carleton |
| 5,715,450 | A | 2/1998 | Ambrose et al. |
| 5,761,419 | A | 6/1998 | Schwartz |
| 5,819,038 | A | 10/1998 | Carleton |
| 5,821,937 | A | 10/1998 | Tonelli et al. |
| 5,831,610 | A | 11/1998 | Tonelli et al. |
| 5,873,096 | A | 2/1999 | Lim et al. |

(Continued)

OTHER PUBLICATIONS

Nicoleta C. Brad "Data De-duplication in NoSQL Databases", Copyrigh Nicoleta Carmen Brad, Mar. 2012.*
U.S. Appl. No. 13/986,251, Apr. 16, 2013.

*Primary Examiner* — Etienne Leroux
*Assistant Examiner* — Cindy Nguyen
(74) *Attorney, Agent, or Firm* — Dergosits & Noah LLP; Todd A. Noah

(57) ABSTRACT

Systems and methods are provided for creating indices and loading key-value pairs for NoSQL databases. Attributes are created that correspond to records in a NoSQL database based on corresponding record fields. An index is created based on the attributes. A memory is loaded with attributes that correspond to a subset of the index as keys in a key-value pair and identifiers that correspond to records that correspond to the attributes as values in the key-value pair. The attributes that correspond to the subset of the index are sorted in the memory. Any duplicate attributes are identified from the sorted attributes in the memory. Any identifiers that correspond to any duplicate attributes also identify records in the NoSQL database to be evaluated as potential duplicate records.

20 Claims, 4 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0246503 A1* | 10/2011 | Bender et al. ............... 707/769 |
| 2012/0233137 A1 | 9/2012 | Jakobson et al. |
| 2012/0246190 A1* | 9/2012 | Surtani et al. ............... 707/769 |
| 2013/0124545 A1* | 5/2013 | Holmberg et al. ........... 707/756 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jackobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

\* cited by examiner

200 \  202

| Attribute | Identifier | Given Name | Family Name | Phone | Email | Zip Code | City |
|---|---|---|---|---|---|---|---|
| ... | ... | ... | ... | ... | ... | ... | ... |
| MJackson.94104 | 501,234 | Maria | Jackson | ... | ... | 94104 | S.F. |
| MJohnson.94111 | 501,235 | Mary | Johnson | ... | ... | 94111 | S.F. |
| MJones.94133 | 501,236 | Mark | Jones | ... | ... | 94133 | S.F. |
| MJohnson.94111 | 501,237 | Mary | Johnson | ... | ... | 94111 | S.F. |
| MJones.94133 | 501,238 | Mike | Jones | ... | ... | 94133 | S.F. |
| MJackson.94104 | 501,239 | Mark | Jackson | ... | ... | 94104 | S.F. |
| ... | ... | ... | ... | ... | ... | ... | ... |

204

| |
|---|
| AA |
| ... |
| MJ |
| ... |
| ZZ |

206

| Key | Value |
|---|---|
| ... | ... |
| MJackson.94104 | 501,234 |
| MJohnson.94111 | 501,235 |
| MJones.94133 | 501,236 |
| MJohnson.94111 | 501,237 |
| MJones.94133 | 501,238 |
| MJackson.94104 | 501,239 |
| ... | ... |

208

| Key | Value |
|---|---|
| ... | ... |
| MJackson.94104 | 501,234 |
| MJackson.94104 | 501,239 |
| MJohnson.94111 | 501,235 |
| MJohnson.94111 | 501,237 |
| MJones.94133 | 501,236 |
| MJones.94133 | 501,238 |
| ... | ... |

210

| Attribute | Identifier | Given Name | Family Name | Phone | Email | Zip Code | City |
|---|---|---|---|---|---|---|---|
| MJackson.94104 | 501,234 | Maria | Jackson | ... | ... | 94104 | S.F. |
| MJackson.94104 | 501,239 | Mark | Jackson | ... | ... | 94104 | S.F. |

FIG. 2

METHOD AND SYSTEM FOR CREATING INDICES AND LOADING KEY-VALUE PAIRS FOR NOSQL DATABASES

CLAIM OF PRIORITY

This application claims the benefit of U.S. Provisional Patent Application 61/661,411 entitled SYSTEMS AND METHODS FOR CREATING AND LOADING FAST INDICES TO A "KEY/VALUE" NOSQL SYSTEM, by Khimich, et al., filed Jun. 19, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CREATING INDICES AND LOADING KEY-VALUE PAIRS FOR NOSQL DATABASES

One or more implementations relate generally to creating indices and loading key-value pairs for NoSQL databases.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A NoSQL database provides a higher scalability for storing and retrieving data than traditional relational databases. NoSQL database systems are often highly optimized for retrieval and appending operations and often offer little functionality beyond record storage. The reduced run-time flexibility compared to full SQL systems is compensated by marked gains in scalability and performance for certain data models. NoSQL database systems are useful when working with a huge quantity of data when the data's nature does not require a relational model. Such data may be structured, but NoSQL is used when what really matters is the ability to store and retrieve great quantities of data, not the relationships between the data elements. Usage examples include storing millions of data records as key-value pairs in one or a few associative arrays. A key-value pair is a fundamental data representation in computing systems and applications, in which all or part of the data model may be expressed as a collection of tuples <attribute name, value>, for which each element is a key-value pair. An associative array is an unordered list of unique attributes with associated values. Such organization is particularly useful for statistical or real-time analysis of growing lists of data elements.

However, loading a key-value pair into memory for the records in a NoSQL database may be a very lengthy and inefficient process. For example, if millions of records for business contacts need to be accessed by a database system, the database system may execute a de-duplication process in advance to reduce the possibility that data for the same business contact is not stored in multiple different records. But in order to delete or merge data identified in duplicate records, a key-value pair first needs to be loaded in memory for every record in the NoSQl database, a process that may require many hours to load a key-value pair into memory for millions of records. Even after a key-value pair is loaded in memory for each record during a time-consuming loading process, the de-duplication process may not identify each duplicate record. For example, if the key-value pair for business contacts is the telephone number of a business contact and the unique identifier of the record for the business contact, many duplicate records may not be identified because a record for a sales manager includes the sales manager's office phone number while another record inadvertently created for the same sales manager includes the sales manager's mobile phone number. Similar problems with de-duplication may also exist for email addresses, mailing addresses, and other data elements that may not uniquely identify a business contact.

BRIEF SUMMARY

In accordance with embodiments, there are provided systems and methods for creating indices and loading key-value pairs for NoSQL databases. Attributes are created that correspond to records in a NoSQL database based on corresponding record fields. For example, a database system creates attributes for records of business contacts, such as the attribute "MJackson.94104" for a business contact, where the "M" corresponds to the first letter of the record field for the given name "Maria" of the business contact, "Jackson" corresponds to the record field for the family name "Jackson" of the business contact, and "94104" corresponds to the record field for the zip code of the business contact. An index is created based on the attributes. For example, the database system creates an index based on the first two potential letters of the created attributes, such that the index potentially begins with the letters "AA," potentially ends with the letters "ZZ," and includes the letters "MJ" that correspond to the attribute "MJackson.94104" for the business contact example. Memory is loaded with attributes that correspond to a subset of the index as keys in a key-value pair and identifiers that correspond to the records that correspond to the attributes as values in the key-value pair. Rather than loading memory with more than 1,000,000 key-value pairs, which will take a significant amount of time, the database system only loads the key-value pairs for subsets of the index based on the first two letters of the created attributes, such as the sub-index "AA," or the sub-index "MJ." When the database system loads the sub-index "MJ," the system loads the attribute "MJackson.94104" as a key and the unique identifier for the corresponding record, such as "501,234" as the value. The attributes that correspond to the subset of the index are sorted in memory. For example, the database system sorts all of the attributes that begin with the letters "MJ" in memory to create an alphabetically ordered list of the attributes. Any duplicate attributes are identified from the sorted attributes in memory. For example, the database system identifies one instance of the attribute "MJackson.94104" corresponding to the value "501,234" and another instance of the attribute "MJackson.94104" corresponding to the value "501,239." Any identifiers that correspond to any duplicate attributes also identify records in the NoSQL database to be evaluated as potential duplicate records. For example, the database system loads memory with the record for "Maria Jackson" that corresponds to the value "501,234" and the record for "Mark Jackson" that corresponds to the value "501,234." Identifying duplicate records for merging and/or deletion by loading and sorting key-value pairs for sub-indexes is more efficient, and enables the database system to subsequently load the full index for use much more quickly. Accordingly, systems and methods are provided which enable a database system to create indices and load key-value pairs for NoSQL databases.

While one or more implementations and techniques are described with reference to an embodiment in which creating indices and loading key-value pairs for NoSQL databases is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 2 illustrates a block diagram of an example of data used when creating indices and loading key-value pairs for NoSQL databases;

DETAILED DESCRIPTION

General Overview

Systems and methods are provided for creating indices and loading key-value pairs for NoSQL databases.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for creating indices and loading key-value pairs for NoSQL databases will be described with reference to example embodiments.

The following detailed description will first describe a method for creating indices and loading key-value pairs for NoSQL databases.

Next, an example of data used for creating indices and loading key-value pairs for NoSQL databases is described.

Figure 1:
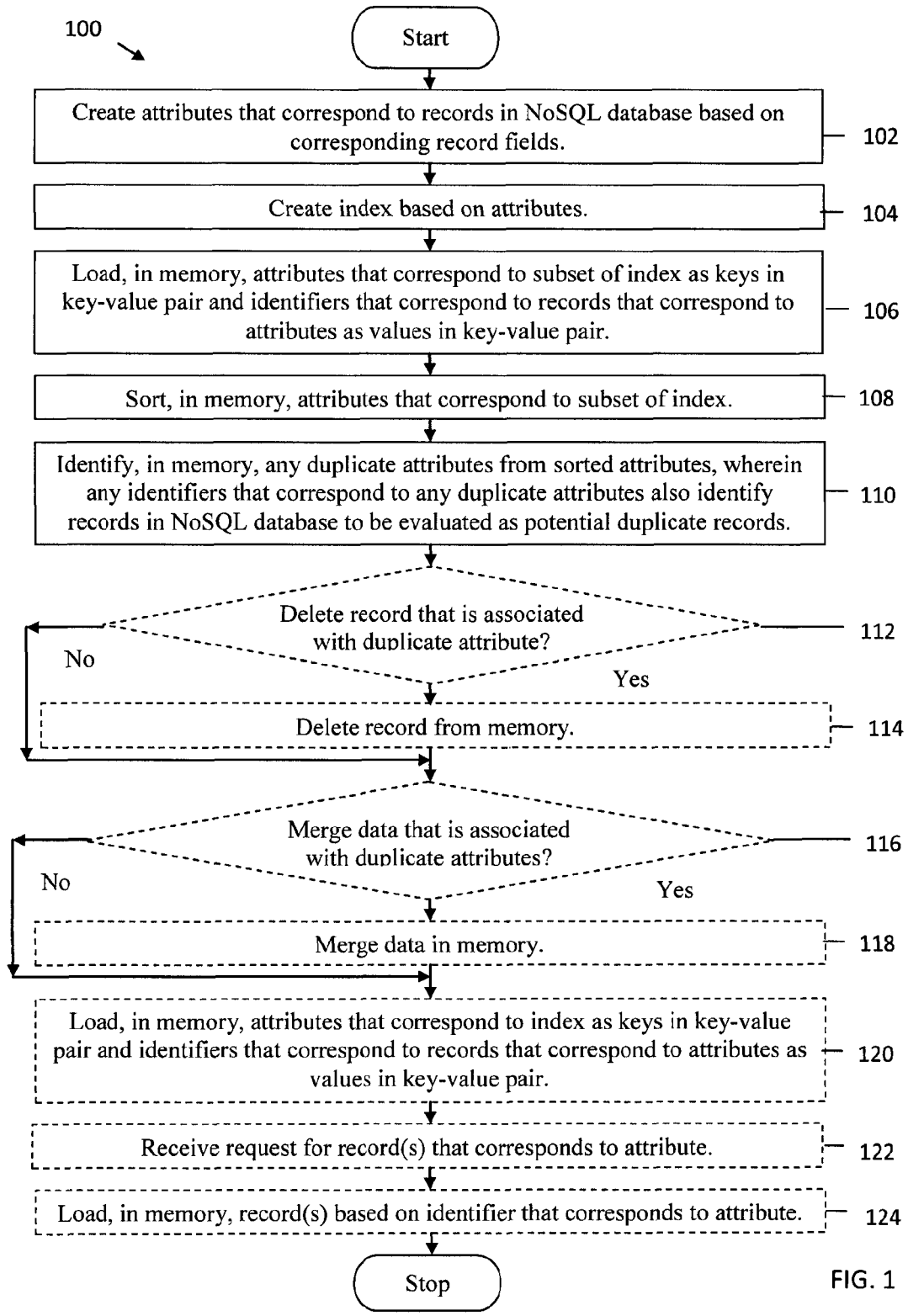
FIG. 1 is an operational flow diagram illustrating a high level overview of a method for creating indices and loading key-value pairs for NoSQL databases in an embodiment.

FIG. 1 is an operational flow diagram illustrating a high level overview of a method 100 for creating indices and loading key-value pairs for NoSQL databases. As shown in FIG. 1, a database system can create indices and load key-value pairs for NoSQL databases.

In block 102, attributes are created that correspond to records in a NoSQL database based on corresponding record fields. For example and without limitation, this can include a database system creating attributes for records of business contacts, such as the attribute "MJackson.94104" for a business contact, where the "M" corresponds to the first letter of the record field for the given name "Maria" of the business contact, "Jackson" corresponds to the record field for the family name "Jackson" of the business contact, and "94104" corresponds to the record field for the zip code of the business contact. By combining parts of fields and/or complete fields to create an attribute, the database system increases the possibility of identifying duplicate records, as the attribute "MJackson.94104" may identify duplicate records for Maria Jackson even when these duplicate records include her office phone number and her mobile phone number. Furthermore, the attribute "MJackson.94104" may also enable differentiation between a record for a Maria Jackson that includes the record field for the 94104 zip code of San Francisco and a record for a different Maria Jackson that includes the record field for the 10005 zip code of New York City, without explicitly incorporating the record fields for the city or the state in the attribute. An example of records in a NoSQL database is discussed below in reference to FIG. 2.

In block 104, an index is created based on the attributes. By way of example and without limitation, this can include the database system creating an index based on the first two potential letters of the created attributes, such that the index potentially begins with the letters "AA," potentially ends with the letters "ZZ," and includes the letters "MJ" that correspond to the attribute "MJackson.94104" for the business contact example. If the database system creates an index based on 26 potential first letters, and 26 potential second letters, a total of 676 sub-indices are created, as 26 multiplied by 26 equals 676. If the database system creates an index based on 26 potential first letters plus 10 potential first digits (0, 1, 2, 3, 4, 5, 6, 7, 8, 9) for a total of 36 potential first alphanumeric characters, and 36 potential second alphanumeric characters, a total of 1,296 sub-indices are created, as 36 multiplied by 36 equals 1,296. In either example, the number of sub-indices is optimal for loading and sorting key-value pairs. For example, rather than requiring many hours to load 1,000,000 key-value pairs for records of contacts in a NoSQL database, loading less than 1,000 key-value pairs may be completed in a manner of minutes, as 1,000,000 key-value pairs divided by 1,296 indices results in an average number of 771 key-value pairs for each sub-index. In contrast, if the database system was to create an index that includes too many sub-indices, the loading and sorting process would not be optimal. For example, if the database system used the family name for a business contact as the index, this index may include more than 20,000 sub-indices, such that the loading and sorting process would be executed on more than 20,000 occasions, instead of on a maximum of only 1,296 occasions. An example of an index for a NoSQL database is discussed below in reference to FIG. 2.

In block 106, memory is loaded with attributes that correspond to a subset of the index as keys in a key-value pair and identifiers that correspond to the records that correspond to the attributes as values in the key-value pair. Rather than loading memory with more than 1,000,000 key-value pairs, which will take a significant amount of time, this can include the database system only loading the key-value pairs for subsets of the index based on the first two characters of the created attributes, such as the sub-index "AA," or the sub-index "MJ." When the database system loads the sub-index "MJ," the system loads the attribute "MJackson.94104" as a key and the unique identifier for the corresponding record, such as "501,234" as the value. An example of loaded key-value pairs is discussed below in reference to FIG. 2.

In block 108, the attributes that correspond to a subset of an index are sorted in memory. For example and without limitation, this can include the database system sorting all of the attributes that begin with the letters "MJ" in memory to create an alphabetically ordered list of the attributes, along with each unique identifier for each corresponding record. An example of sorted key-values pairs is discussed below in reference to FIG. 2.

In block 110, any duplicate attributes are identified from the sorted attributes in memory. For example, the database system identifies one instance of the attribute "MJackson.94104" corresponding to the value "501,234" and another instance of the attribute "MJackson.94104" corresponding to the value "501,239." Any identifiers that correspond to any duplicate attributes also identify records in the NoSQL database to be evaluated as potential duplicate records. By way of example and without limitation, this can include the database system loading memory with the record for "Maria Jackson" that corresponds to the value "501,234" and the record for "Mark Jackson" that corresponds to the value "501,234."

In block 112, a determination is optionally made whether to delete a record that is associated with a duplicate attribute. In embodiments, this can include the database system determining whether to delete either the record for "Maria Jackson" or the record for "Mark Jackson," which are both associated with the same attribute "MJackson.94104." If the database system determines to delete a record that is associated with a duplicate attribute, the method 100 continues to block 114. If the database system determines not to delete a record that is associated with a duplicate attribute, the method 100 proceeds to block 116.

In block 114, a record is optionally deleted from memory. For example and without limitation, this can include the database system deleting the "501,235" identifier from the sub-index "MJ" in memory instead of deleting the "501,237" identifier because both of these identifiers are associated with the same attribute "MJohnson.94111" and the record associated with the "501,235" identifier includes only stale data recorded before Mary was promoted by her employer.

In block 116, a determination is optionally made whether to merge data that is associated with duplicate attributes. By way of example and without limitation, this can include the database system determining whether to merge the data for the "501,235" identifier with the data for the value "501,237" because both of these identifiers are associated with the same attribute "MJohnson.94111." If the database system determines to merge data that is associated with duplicate attributes, the method 100 continues to block 118. If the database system determines not to merge data that is associated with duplicate attributes, the method 100 proceeds to block 120.

In block 118, data is optionally merged in memory. In embodiments, this can include the database system merging the data for the "501,235" identifier with the data for the "501,237" identifier in the "MJ" sub-index in memory because both of these identifiers are associated with the same attribute "MJohnson.94111" and the data associated with the record for the "501,235" identifier includes data recorded before Mary was promoted by her employer that is not included in the data associated with the record for the "501,237" identifier, such as Mary's personal mobile phone number.

In block 120, memory is optionally loaded with attributes that correspond to the index as keys in a key-value pair and identifiers that correspond to records that correspond to the attributes as values in the key-value pair. For example and without limitation, this can include the database system loading memory with all of the key-value pairs that correspond to the entire index that potentially begins with the letters "AA," potentially ends with the letters "ZZ," and includes the letters "MJ" that correspond to the attribute "MJackson.94104" and the identifier "501,234." The loading of the key-value pairs that correspond to the entire index is the loading from all data records, but this process occurs in less time and more efficiently than in the prior art. The loaded key-value pairs are fewer in number due to the deleting of records from the sub-indexes and the merging of data for records in the sub-indexes. The loaded key-value pairs are also ready to be accessed, as no lengthy de-duplication process for millions of records needs to be executed because the de-duplication process already occurred for the much more manageable loading and sorting of key-value pairs that was often executed very efficiently and quickly for less than one thousand key-value-pairs.

In block 122, a request for any records that correspond to an attribute is optionally received. By way of example and without limitation, this can include the database system receiving a request for any records that correspond to a potential new business contact named "Margaret Jackson" whose zip code is "94104" resulting in the database system creating the attribute "MJackson.94104" to search for potential previously existing duplicates of this potential new record.

In block 124, memory is optionally loaded with records based on an identifier that corresponds to the attribute. In embodiments, this can include the database system loading in memory the two records based on the identifiers "501,234" and "501,239" which correspond to the attribute "MJackson.94104." In this example, the loaded records are for business contacts identified as "Maria Jackson" and "Mark Jackson," such that the potential new record for "Margaret Jackson" is stored with its unique identifier in the NoSQL database for business contacts.

The method 100 may be repeated as desired. Although this disclosure describes the blocks 102-124 executing in a particular order, the blocks 102-124 may be executed in a different order.

FIG. 2 illustrates a block diagram of example data used when creating indices and loading key-value pairs for NoSQL databases. FIG. 2 includes a section of records 202 from a NoSQL database, an index 204, a key-value pair 206 based on the section of records 202, a sorted key-value pair 208 based on the section of records 202, and records loaded 210 in response to a request for records associated with an attribute. The section of records 202 includes unsorted records that correspond to the sub-index "MJ" and also correspond to the city San Francisco, although other records may exist that correspond to the sub-index "MJ" that do not correspond to the city San Francisco. The index 204 potentially begins with the letters "AA," potentially ends with the letters "ZZ," and includes the letters "MJ" that correspond to the attribute "MJackson.94104" from the section of records 202. The key-value pair 206 includes unsorted attributes and the unique identifiers for their corresponding records for the section of records 202. Even though this simple example of the key-value pair 206 includes only six key-value pairs, a little time is still required to visually identify whether any duplicate attributes exist. In the real world, where each sub-index may include up to one thousand attributes on average, identifying duplicate attributes is a much lengthier process for unsorted key-value pairs. The key-value pair 208 includes sorted attributes and the unique identifiers for their corresponding records for the section of records 202, such that visually identifying the duplicate attributes is much easier than in the key-value pair 206. The loading and sorting of more manageable sizes of key-value pairs enables the database system to identify duplicate attributes more quickly and efficiently. The records loaded 210 are the records loaded in response to a request to load any records based on the identifiers "501,234" and "501,239" which correspond to the attribute "MJackson.94104." The records loaded 210 identify the existing records which correspond to the attribute "MJackson.94104" for business contacts named "Maria Jackson" and "Mark Jackson," which are not duplicate records, and which enable the addition of a record for a new business contact named "Margaret Jackson."

System Overview

Figure 3:
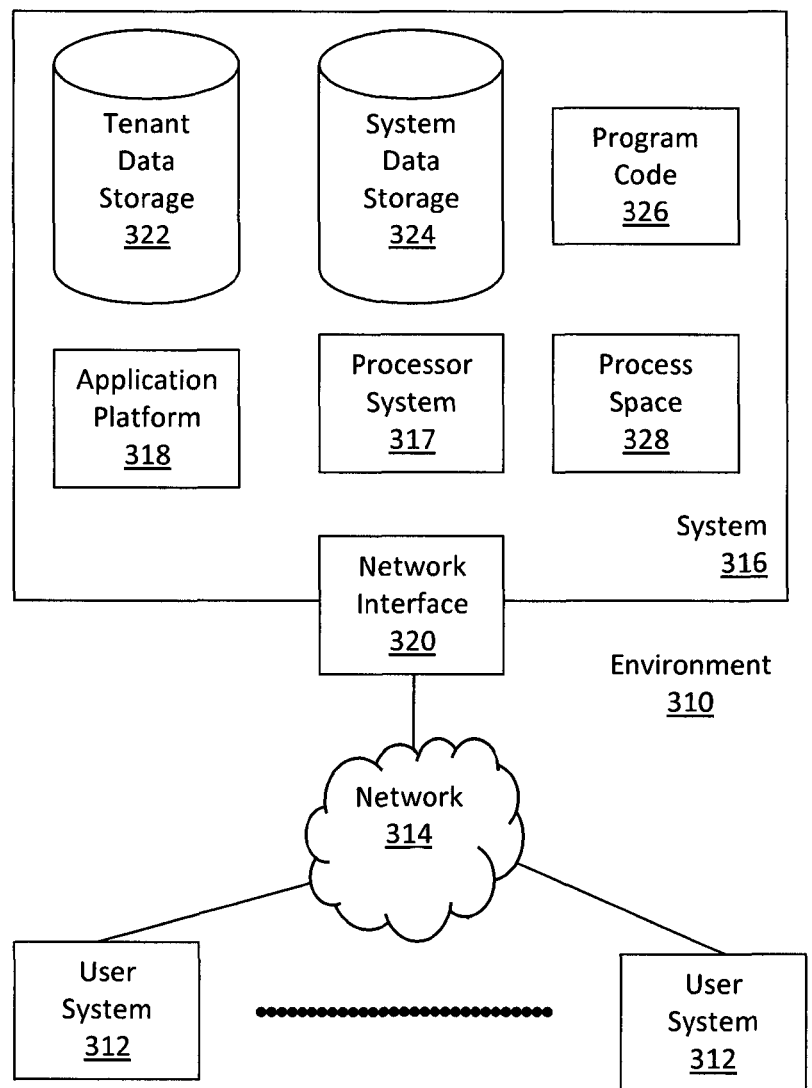
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
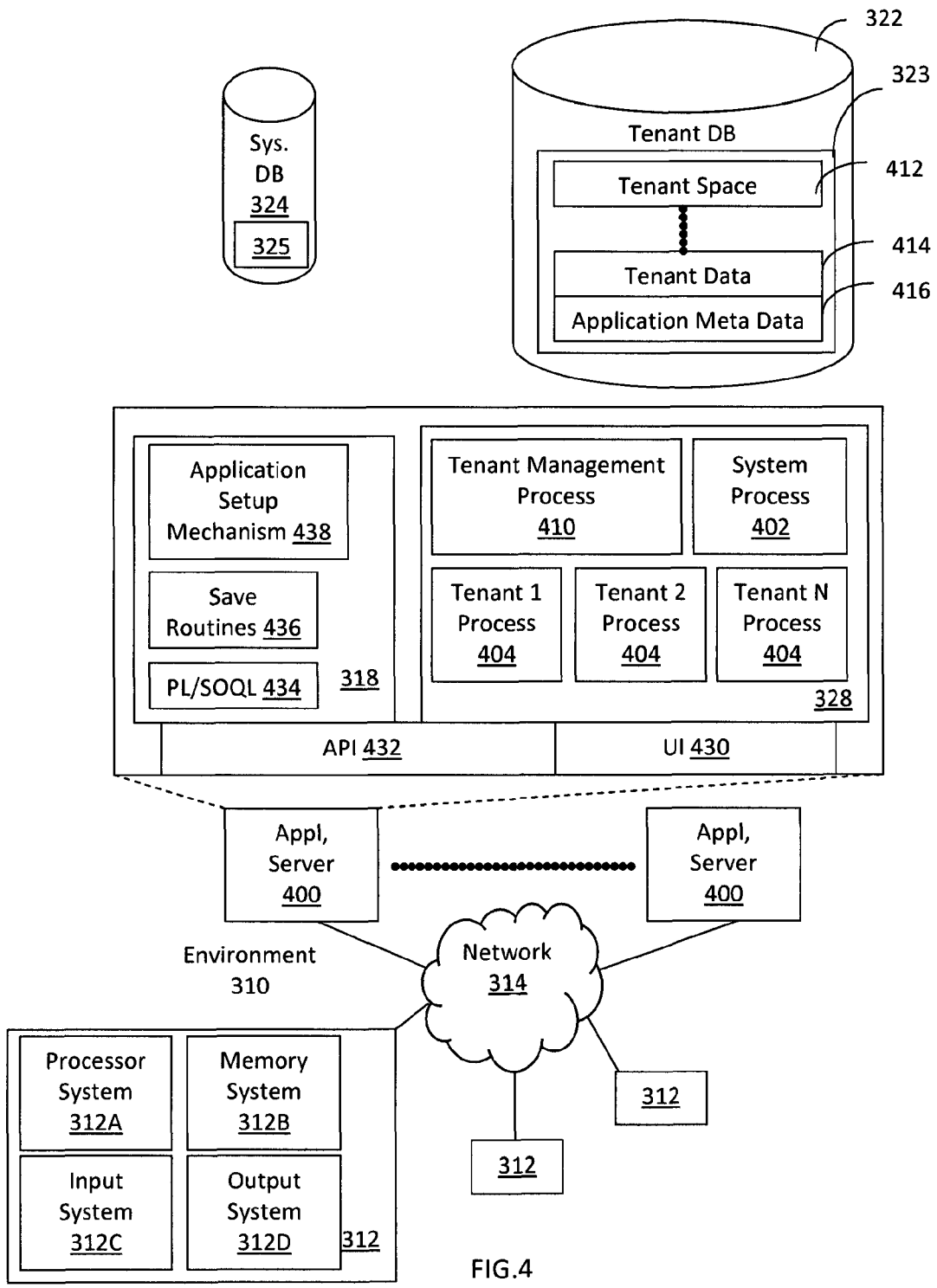
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for creating indices and loading key-value pairs for NoSQL databases, the apparatus comprising:
 a processor; and
 one or more stored sequences of instructions which, when executed by the processor,
 cause the processor to carry out the steps of:
  creating a plurality of attributes that correspond to a plurality of records in a NoSQL database, wherein each attribute of the plurality of attributes comprises data from a corresponding plurality of record fields;
  creating an index based on the plurality of attributes;
  loading, in a memory, a plurality of attributes that correspond to a subset of the index as keys in a key-value pair and a plurality of identifiers that correspond to a plurality of records that correspond to the plurality of attributes as values in the key-value pair;
  sorting, in the memory, the plurality of attributes that correspond to the subset of the index; and
  identifying, in the memory, any duplicate attributes from the sorted plurality of attributes, wherein any identifiers that correspond to the any duplicate attributes also identify records in the NoSQL database to be evaluated as to whether the identified records are duplicates.

2. The apparatus of claim 1, wherein the plurality of attributes that correspond to the plurality of records in a NoSQL database is based on an alphanumeric combination of the corresponding plurality of record fields and the index is based on an alphanumeric subset of the alphanumeric combination.

3. The apparatus of claim 1, wherein the steps further comprise:
 determining whether to delete a record that is associated with a duplicate attribute; and
 deleting the record from the memory in response to a determination to delete the record associated with the duplicate attribute.

4. The apparatus of claim 1, wherein the steps further comprise:
 determining whether to merge a plurality of records that are associated with a plurality of duplicate attributes; and
 merging the plurality of records in the memory in response to a determination to merge the plurality of records associated with the plurality of duplicate attributes.

5. The apparatus of claim 1, wherein the steps further comprise:
 loading, in the memory, a plurality of attributes that correspond to the index as the keys in the key-value pair and a plurality of identifiers that correspond to a plurality of records that correspond to the plurality of attributes as the values in the key-value pair;
 receiving a request for at least one record that corresponds to an attribute of the plurality of attributes; and
 loading, in the memory, the at least one record based on an identifier that corresponds to the attribute of the plurality of attributes.

6. A non-transitory machine-readable medium carrying one or more sequences of instructions for creating indices and loading key-value pairs for NoSQL databases, which instructions, when executed by one or more processors, cause the one or more processors to carry out the steps of:
 creating a plurality of attributes that correspond to a plurality of records in a NoSQL database, wherein each attribute of the plurality of attributes comprises data from a corresponding plurality of record fields;
 creating an index based on the plurality of attributes;
 loading, in a memory, a plurality of attributes that correspond to a subset of the index as keys in a key-value pair and a plurality of identifiers that correspond to a plurality of records that correspond to the plurality of attributes as values in the key-value pair;
 sorting, in the memory, the plurality of attributes that correspond to the subset of the index; and
 identifying, in the memory, any duplicate attributes from the sorted plurality of attributes, wherein any identifiers that correspond to the any duplicate attributes also identify records in the NoSQL database to be evaluated as to whether the identified records are duplicates.

7. The non-transitory machine-readable medium of claim 6, wherein the plurality of attributes that correspond to the plurality of records in a NoSQL database is based on an alphanumeric combination of the corresponding plurality of record fields and the index is based on an alphanumeric subset of the alphanumeric combination.

8. The non-transitory machine-readable medium of claim 6, wherein the steps further comprise:
   determining whether to delete a record that is associated with a duplicate attribute; and
   deleting the record from the memory in response to a determination to delete the record associated with the duplicate attribute.

9. The non-transitory machine-readable medium of claim 6, wherein the steps further comprise:
   determining whether to merge a plurality of records that are associated with a plurality of duplicate attributes; and
   merging the plurality of records in the memory in response to a determination to merge the plurality of records associated with the plurality of duplicate attributes.

10. The non-transitory machine-readable medium of claim 6, wherein the steps further comprise:
    loading, in the memory, a plurality of attributes that correspond to the index as the keys in the key-value pair and a plurality of identifiers that correspond to a plurality of records that correspond to the plurality of attributes as the values in the key-value pair;
    receiving a request for at least one record that corresponds to an attribute of the plurality of attributes; and
    loading, in the memory, the at least one record based on an identifier that corresponds to the attribute of the plurality of attributes.

11. A method for creating indices and loading key-value pairs for NoSQL databases, the method comprising:
    creating a plurality of attributes that correspond to a plurality of records in a NoSQL database, wherein each attribute of the plurality of attributes comprises data from a corresponding plurality of record fields;
    creating an index based on the plurality of attributes;
    loading, in a memory, a plurality of attributes that correspond to a subset of the index as keys in a key-value pair and a plurality of identifiers that correspond to a plurality of records that correspond to the plurality of attributes as values in the key-value pair;
    sorting, in the memory, the plurality of attributes that correspond to the subset of the index; and
    identifying, in the memory, any duplicate attributes from the sorted plurality of attributes, wherein any identifiers that correspond to the any duplicate attributes also identify records in the NoSQL database to be evaluated as to whether the identified records are duplicates.

12. The method of claim 11, wherein the plurality of attributes that correspond to the plurality of records in a NoSQL database is based on an alphanumeric combination of the corresponding plurality of record fields and the index is based on an alphanumeric subset of the alphanumeric combination.

13. The method of claim 11, wherein the method further comprises:
    determining whether to delete a record that is associated with a duplicate attribute; and
    deleting the record from the memory in response to a determination to delete the record associated with the duplicate attribute.

14. The method of claim 11, wherein the method further comprises:
    determining whether to merge a plurality of records that are associated with a plurality of duplicate attributes; and
    merging the plurality of records in the memory in response to a determination to merge the plurality of records associated with the plurality of duplicate attributes.

15. The method of claim 11, wherein the method further comprises:
    loading, in the memory, a plurality of attributes that correspond to the index as the keys in the key-value pair and a plurality of identifiers that correspond to a plurality of records that correspond to the plurality of attributes as the values in the key-value pair;
    receiving a request for at least one record that corresponds to an attribute of the plurality of attributes; and
    loading, in the memory, the at least one record based on an identifier that corresponds to the attribute of the plurality of attributes.

16. A method for transmitting code for creating indices and loading key-value pairs for NoSQL databases on a transmission medium, the method comprising:
    transmitting code to create a plurality of attributes that correspond to a plurality of records in a NoSQL database, wherein each attribute of the plurality of attributes comprises data from a corresponding plurality of record fields;
    transmitting code to create an index based on the plurality of attributes;
    transmitting code to load, in a memory, a plurality of attributes that correspond to a subset of the index as keys in a key-value pair and a plurality of identifiers that correspond to a plurality of records that correspond to the plurality of attributes as values in the key-value pair;
    transmitting code to sort, in the memory, the plurality of attributes that correspond to the subset of the index; and
    transmitting code to identify, in the memory, any duplicate attributes from the sorted plurality of attributes, wherein any identifiers that correspond to the any duplicate attributes also identify records in the NoSQL database to be evaluated as to whether the identified records are duplicates.

17. The method for transmitting code of claim 16, wherein the plurality of attributes that correspond to the plurality of records in a NoSQL database is based on an alphanumeric combination of the corresponding plurality of record fields and the index is based on an alphanumeric subset of the alphanumeric combination.

18. The method for transmitting code of claim 16, wherein the method further comprises:
    determining whether to delete a record that is associated with a duplicate attribute; and
    deleting the record from the memory in response to a determination to delete the record associated with the duplicate attribute.

19. The method for transmitting code of claim 16, wherein the method further comprises:
    determining whether to merge a plurality of records that are associated with a plurality of duplicate attributes; and
    merging the plurality of records in the memory in response to a determination to merge the plurality of records associated with the plurality of duplicate attributes.

20. The method for transmitting code of claim 16, wherein the method further comprises:
    loading, in the memory, a plurality of attributes that correspond to the index as the keys in the key-value pair and a plurality of identifiers that correspond to a plurality of records that correspond to the plurality of attributes as the values in the key-value pair;
    receiving a request for at least one record that corresponds to an attribute of the plurality of attributes; and loading, in the memory, the at least one record based on an identifier that corresponds to the attribute of the plurality of attributes.

\* \* \* \* \*